US011162381B2

(12) United States Patent
Hayashi et al.

(10) Patent No.: US 11,162,381 B2
(45) Date of Patent: Nov. 2, 2021

(54) TURBOCHARGER

(71) Applicant: IHI Corporation, Tokyo (JP)

(72) Inventors: Katsunori Hayashi, Tokyo (JP); Hidenori Kojima, Tokyo (JP); Koutarou Itou, Tokyo (JP); Yoshitaka Iwasa, Tokyo (JP); Takafumi Ueda, Tokyo (JP); Kenichi Segawa, Tokyo (JP)

(*) Notice: Subject to any disclaimer, the term of this patent is extended or adjusted under 35 U.S.C. 154(b) by 0 days.

(21) Appl. No.: 17/031,959

(22) Filed: Sep. 25, 2020

(65) Prior Publication Data

US 2021/0010387 A1   Jan. 14, 2021

Related U.S. Application Data

(63) Continuation of application No. PCT/JP2019/000249, filed on Jan. 8, 2019.

(30) Foreign Application Priority Data

Mar. 29, 2018 (JP) .............................. JP2018-065292

(51) Int. Cl.
*F01D 17/16* (2006.01)
*F02C 6/12* (2006.01)

(52) U.S. Cl.
CPC .............. *F01D 17/165* (2013.01); *F02C 6/12* (2013.01); *F05D 2220/40* (2013.01)

(58) Field of Classification Search
CPC ...... F01D 17/165; F02C 6/12; F05D 2220/40; F05D 2230/642; F05D 2260/231; F05D 2260/56; F02B 37/24; F02B 39/00
See application file for complete search history.

(56) References Cited

U.S. PATENT DOCUMENTS

2009/0317247 A1   12/2009   Hoecker et al.
2010/0008766 A1   1/2010    Scholz et al.
(Continued)

FOREIGN PATENT DOCUMENTS

CN   107532504    1/2018
JP   2010-019252  1/2010
(Continued)

OTHER PUBLICATIONS

International Search Report dated Mar. 19, 2019 for PCT/JP2019/000249.

(Continued)

*Primary Examiner* — Audrey B. Walter
*Assistant Examiner* — Edward Bushard
(74) *Attorney, Agent, or Firm* — SOEI Patent & Law Firm

(57) ABSTRACT

A turbocharger includes a turbine housing configured to accommodate a turbine wheel provided at one end of a rotation shaft, a bearing housing joined to the turbine housing and in which a bearing for supporting the rotation shaft is provided; and a variable nozzle unit that is disposed between the turbine housing and the bearing housing. The variable nozzle unit includes a nozzle ring disposed around a rotation axis of the rotation shaft and a support ring provided adjacent to the nozzle ring that includes an outer peripheral portion partially in contact with the turbine housing. One or more non-contact portions are formed in the outer peripheral portion of the support ring and do not contact the turbine housing.

20 Claims, 6 Drawing Sheets

(56) References Cited

U.S. PATENT DOCUMENTS

| | | |
|---|---|---|
| 2011/0038715 A1 | 2/2011 | Frank et al. |
| 2013/0302148 A1 | 11/2013 | Solanki et al. |
| 2016/0281593 A1 | 9/2016 | Segawa et al. |
| 2017/0058764 A1* | 3/2017 | Bayod .................... F02B 37/22 |
| 2017/0130646 A1* | 5/2017 | Yoshizaki ............... F02B 37/24 |
| 2018/0156061 A1 | 6/2018 | Asakawa et al. |

FOREIGN PATENT DOCUMENTS

| | | |
|---|---|---|
| JP | 2015-117645 | 6/2015 |
| JP | 2016-003565 | 1/2016 |

OTHER PUBLICATIONS

International Preliminary Report on Patentability with Written Opinion dated Oct. 8, 2020 for PCT/JP2019/000249.

* cited by examiner

TURBOCHARGER

CROSS-REFERENCE TO RELATED APPLICATION

This application is a continuation application of PCT Application No. PCT/JP2019/000249, filed Jan. 8, 2019, the entire contents of which are incorporated herein by reference.

BACKGROUND

For example, as described in Japanese Unexamined Patent Publication No. 2015417645 and Japanese Unexamined Patent Publication No. 2016-003565, a variable nozzle unit applied to a turbocharger is known. The variable nozzle unit includes a plurality of variable nozzles, a support ring, a connecting pin, and the like and is configured to rotate the variable nozzles. In the unit described in Japanese Unexamined Patent Publication No. 2015-117645, a notch is formed around a coupling area of the support ring. The notch allows deformation of a cylindrical intermediate portion. In the unit described in Japanese Unexamined Patent Publication No. 2016-003565, a pin hole of the support ring into which the connecting pin is inserted is configured to extend in a radial direction of the support ring. The pin hole has an elliptical shape or a long hole shape. The pin hole absorbs a difference in thermal expansion between a first nozzle ring and the support ring in the radial direction.

SUMMARY

A turbocharger according to an aspect of the present disclosure includes a turbine housing configured to accommodate a turbine wheel provided at one end of a rotation shaft, a bearing housing joined to the turbine housing and in which a bearing for supporting the rotation shaft is provided; and a variable nozzle unit that is disposed between the turbine housing and the bearing housing. The variable nozzle unit includes a nozzle ring disposed around a rotation axis of the rotation shaft and a support ring provided adjacent to the nozzle ring that includes an outer peripheral portion partially in contact with the turbine housing. One or more non-contact portions are formed in the outer peripheral portion of the support ring and do not contact the turbine housing.

DETAILED DESCRIPTION

Figure 1:
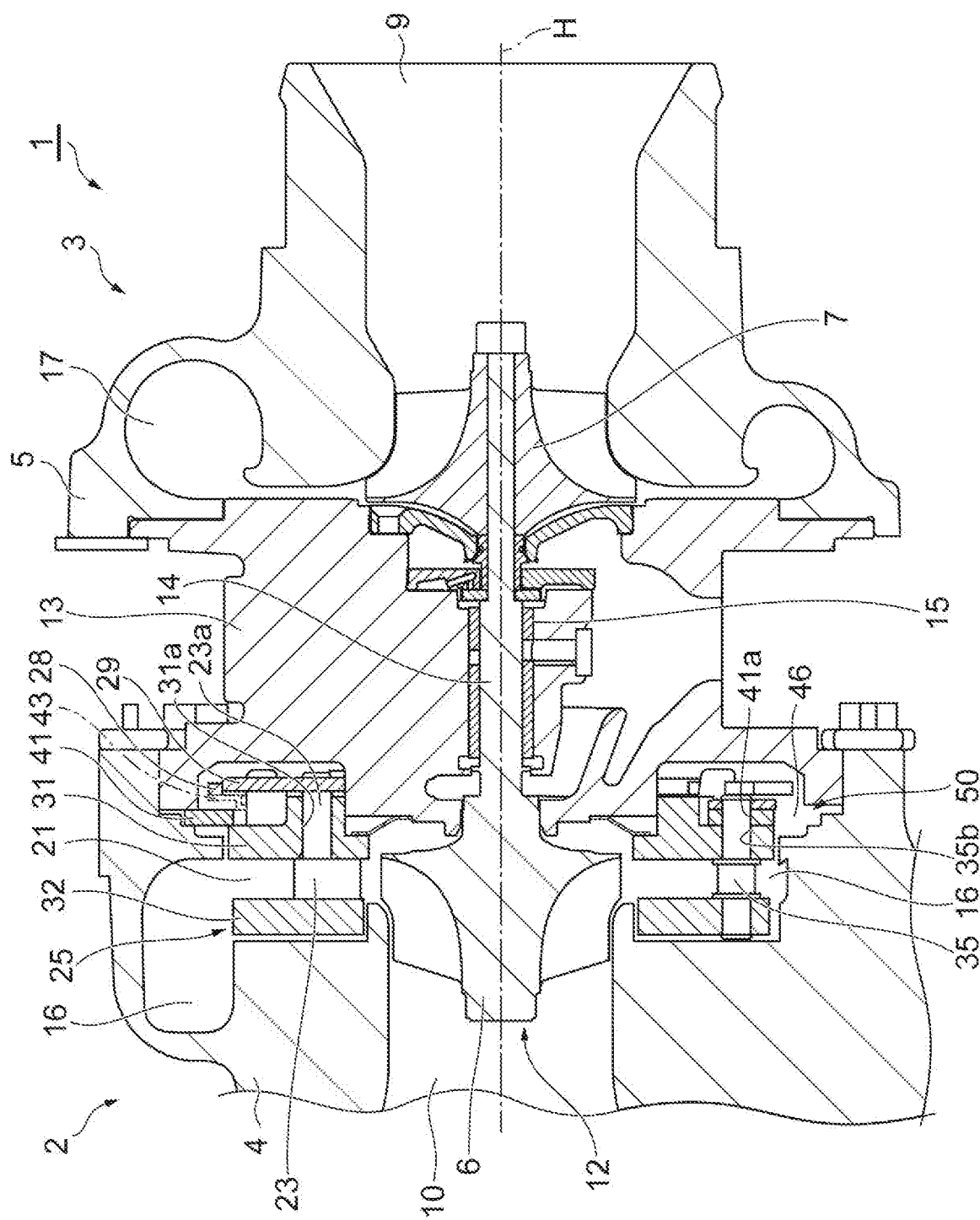
FIG. 1 is a cross-sectional view of a turbocharger according to an example of the present disclosure.

A turbocharger according to an aspect of the present disclosure includes a turbine housing configured to accommodate a turbine wheel provided at one end of a rotation shaft, a bearing housing joined to the turbine housing and in which a bearing for supporting the rotation shaft is provided and a variable nozzle unit that is disposed between the turbine housing and the bearing housing and comprises a nozzle ring disposed around a rotation axis of the rotation shaft and a support ring provided adjacent to the nozzle ring that comprises an outer peripheral portion partially in contact with the turbine housing. One or more non-contact portions are formed in which the outer peripheral portion of the support ring is not in contact with the turbine housing.

According to such a turbocharger, the outer peripheral portion of the support ring comes into contact with the turbine housing, and the variable nozzle unit is held. A non-contact portion of which the outer peripheral portion of the support ring does not come into contact with the turbine housing is formed at one or more positions on the support ring in a circumferential direction. When the support ring thermally expands, thermal deformation of the support ring is not hindered at the non-contact portion. Therefore, the thermal deformation of the support ring of the variable nozzle unit can be selectively controlled or modified to result in a predetermined shape.

In some aspects, the variable nozzle unit comprises one or more connecting pins configured to connect the nozzle ring to the support ring, and the non-contact portion is provided at a location corresponding to the connecting pin in the circumferential direction. Due to an influence of the thermal expansion of the nozzle ring and the like, a force which tends to thermally expand (especially in a radial direction) can act greatly on a portion at which the connecting pin is provided. When the non-contact portion is provided at the position corresponding to the connecting pin, and the support ring receives this force, the support ring can be deformed without trouble.

In some aspects, the non-contact portion comprises one or more cutout portions formed in the outer peripheral portion of the support ring. In this case, the above-described non-contact portion can be easily and reliably created by changing a shape so that the outer peripheral portion of the support ring is cut out.

In some aspects, the non-contact portion comprises one or more concave portions formed in the outer peripheral portion of the support ring and recessed in a direction of the rotation axis. In this case, the above-described non-contact portion can be easily and reliably created by changing a shape so that a surface of the outer peripheral portion of the support ring is recessed.

In some aspects, the non-contact portion comprises a concave portion that is formed in a portion of the turbine housing facing the outer peripheral portion of the support ring and is recessed in a direction of the rotation axis. In this case, the above-described non-contact portion can be easily and reliably created by changing a shape so that a surface of the turbine housing is recessed.

In some aspects, the variable nozzle unit is held by the outer peripheral portion of the support ring that is sandwiched between the turbine housing and the bearing housing at a portion which excludes the non-contact portion. In the non-contact portion, the outer peripheral portion of the support ring is not held by the turbine housing and the bearing housing. Therefore, in the non-contact portion, the thermal deformation of the support ring is not hindered, and the thermal deformation of the support ring can be selectively controlled or modified to result in a predetermined shape.

In some aspects, the variable nozzle unit is held by the nozzle ring that is biased in the direction of the rotation axis by a spring member disposed around the rotation axis and the outer peripheral portion that is pressed against the turbine housing at a portion excluding the non-contact portion. In the non-contact part, the outer peripheral part of the support ring is not pressed against the turbine housing. Therefore, in the non-contact portion, the thermal deformation of the support ring is not hindered, and the thermal deformation of the support ring can be selectively controlled or modified to result in a predetermined shape.

Hereinafter, examples of the present disclosure will be described with reference to the drawings. In the description of the drawings, the same elements will be designated by the same reference numerals, and a duplicate description thereof will be omitted.

A variable capacity turbocharger 1 shown in FIG. 1 is applied to, for example, an internal combustion engine of a ship or a vehicle. As shown in FIG. 1, the variable capacity turbocharger 1 includes a turbine 2 and a compressor 3. The turbine 2 includes a turbine housing 4 and a turbine wheel 6 which is accommodated in the turbine housing 4. The turbine housing 4 includes a scroll passage 16 which extends around the turbine wheel 6 in the circumferential direction. The compressor 3 includes a compressor housing 5 and a compressor wheel 7 which is accommodated in the compressor housing 5. The compressor housing 5 includes a scroll passage 17 which extends around the compressor wheel 7 in the circumferential direction.

The turbine wheel 6 is provided at one end of a rotation shaft 14, and the compressor wheel 7 is provided at the other end of the rotation shaft 14. A bearing housing 13 is provided between the turbine housing 4 and the compressor housing 5. The rotation shaft 14 is rotatably supported by the bearing housing 13 via a bearing 15, and the rotation shaft 14, the turbine wheel 6 and the compressor wheel 7 rotate about a rotation axis H as an integral rotating body 12. That is, the bearing 15 for supporting the rotation shaft 14 is provided in the bearing housing 13.

An exhaust gas inlet (not shown) and an exhaust gas outlet 10 are provided in the turbine housing 4. Exhaust gas discharged from an internal combustion engine (not shown) flows into the turbine housing 4 through the exhaust gas inlet, flows into the turbine wheel 6 through the scroll passage 16 and rotates the turbine wheel 6. Then, the exhaust gas flows out of the turbine housing 4 through the exhaust gas outlet 10.

A suction port 9 and a discharge port (not shown) are provided in the compressor housing 5. When the turbine wheel 6 rotates as described above, the compressor wheel 7 rotates via the rotation shaft 14. The rotating compressor wheel 7 suctions external air through the suction port 9, compresses the external air and discharges the compressed external air from the discharge port through the scroll passage 17. The compressed air discharged from the discharge port is supplied to the above-described internal combustion engine.

Next, the turbine 2 will be described in more detail. The turbine 2 is a variable capacity turbine, and a plurality of variable nozzle vanes 23 are provided in a gas inflow passage 21 which connects the scroll passage 16 to the turbine wheel 6. The plurality of variable nozzle vanes 23 are disposed on a circumference centered on the rotation axis H, and each of the variable nozzle vanes 23 rotates about a rotation axis parallel to the rotation axis H. The gas inflow passage 21 allows the gas flowing from the scroll passage 16 to the turbine wheel 6 to pass therethrough. A cross-sectional area (a throat area) of the gas flow passage is optimally adjusted according to a flow rate of the exhaust gas introduced into the turbine 2 by rotating the variable nozzle vanes 23 as described above.

The turbine 2 includes a variable nozzle unit 25 as a drive mechanism for rotating the variable nozzle vanes 23 as described above. The variable nozzle unit 25 is disposed between the turbine housing 4 and the bearing housing 13 joined to the turbine housing 4. The variable nozzle unit 25 is sandwiched and fixed between the turbine housing 4 and the bearing housing 13, for example.

Hereinafter, the variable nozzle unit 25 will be described. In the following description, when directions are simply referred to as "axial direction", "radial direction", "circumferential direction", and the like, they mean the direction of the rotation axis H of the turbine wheel 6, and the radial direction and the circumferential direction thereof with the rotation axis H as a reference. Further, in the direction of the rotation axis H, the side closer to the turbine 2 may be simply referred to as "turbine side", and the side closer to the compressor 3 may be simply referred to as "compressor side".

The variable nozzle unit 25 includes the plurality of variable nozzle vanes 23, and a first nozzle ring 31 and a second nozzle ring 32 which sandwich the variable nozzle vanes 23 in the axial direction. Each of the first nozzle ring 31 and the second nozzle ring 32 has a ring shape centered on the rotation axis H and are disposed to surround the turbine wheel 6. That is, the first nozzle ring 31 and the second nozzle ring 32 are disposed around the rotation axis H. A region sandwiched between the first nozzle ring 31 and the second nozzle ring 32 forms the above-described gas inflow passage 21. The second nozzle ring 32 faces the scroll passage 16, and the second nozzle ring 32 forms a part of an inner wall of the scroll passage 16. A rotary shaft 23a of each of the variable nozzle vanes 23 is rotatably inserted into a bearing hole 31a of the first nozzle ring 31. The first nozzle ring 31 pivotally supports, for example, each of the variable nozzle vanes 23 in a cantilever manner.

Figure 2:
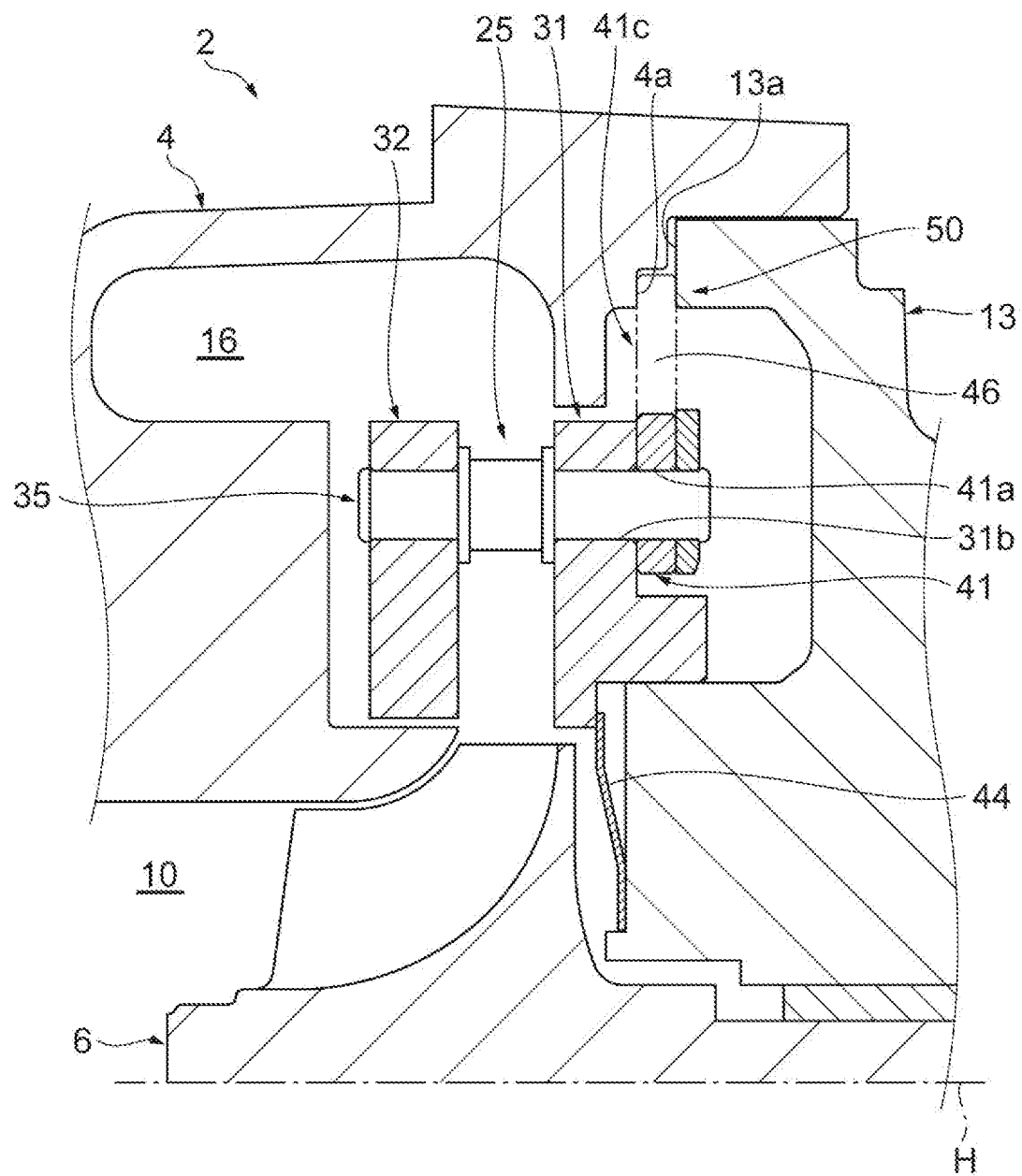
FIG. 2 is a cross-sectional view showing a holding structure of a variable nozzle unit.

A support ring 41 having an annular plate shape is fixed to the compressor side of the first nozzle ring 31 (the side opposite to the variable nozzle unit 25), and also, a drive ring support member 43 having a ring shape is fixed to the compressor side of the support ring 41. A plurality of (for example, three) pin holes are provided in each of the first nozzle ring 31, the second nozzle ring 32, the support ring 41, and the drive ring support member 43. For example, FIGS. 1 and 2 show a pin hole 31b formed in the first nozzle ring 31 and a pin hole 41a formed in the support ring 41. The first nozzle ring 31, the second nozzle ring 32, the support ring 41, and the drive ring support member 43 are connected to each other by arranging these pin holes in a line and inserting a connecting pin 35 into these pin holes. That is, the connecting pin 35 connects the first nozzle ring 31 to the support ring 41.

The support ring 41 and the drive ring support member 43 are co-caulked with the first nozzle ring 31 by a portion of the connecting pin 35 on the compressor side. Further, two flange portions for positioning the first nozzle ring 31 and the second nozzle ring 32 are provided on a portion of the connecting pin 35 on the turbine side. The two flange portions are manufactured with a highly accurate dimension therebetween, and thus dimensional accuracy of the gas inflow passage 21 in the axial direction is ensured. The drive ring 28 is supported rotatably around the rotation axis H by mounting the drive ring 28 on the drive ring support member 43.

The drive ring 28 is a member which transmits a driving force input from the outside to the variable nozzle vanes 23 and is formed as a single member made of, for example, a metal material. The drive ring 28 has a ring shape which extends on a circumference centered on the rotation axis H and rotates around the rotation axis H by receiving a driving force from the outside. Levers 29 are mounted on the rotary shafts 23a of the respective variable nozzle vanes 23 and are disposed inside the drive ring 28 at regular intervals on the circumference.

In such a variable nozzle unit 25, a portion which includes the first nozzle ring 31, the second nozzle ring 32, the support ring 41, and the connecting pin 35 is fixed to the turbine housing 4 and pivotally supports the plurality of variable nozzle vanes 23. Also, a disc spring 44 which is brought into contact with an end surface of the first nozzle ring 31 in the direction of the rotation axis H and biases the variable nozzle unit 25 toward the turbine side is provided between the first nozzle ring 31 and a part of the bearing housing 13 (a portion which faces a back surface of the turbine wheel 6).

Hereinafter, a holding structure of the variable nozzle unit 25 in the variable capacity turbocharger 1 will be described in detail with reference to FIGS. 1 and 2. In the variable capacity turbocharger 1, an outer peripheral portion 41c of the support ring 41 is sandwiched between the turbine housing 4 and the bearing housing 13, and thus the entire variable nozzle unit 25 is held in these housings. The outer peripheral portion 41c of the support ring 41 is sandwiched in the axial direction by a wall surface 4a (perpendicular to the rotation axis H) of the turbine housing 4 which extends in the radial direction and a wall surface 13a (perpendicular to the rotation axis H) of the bearing housing 13 which extends in the radial direction.

The outer peripheral portion 41c of the support ring 41 provided adjacent to the first nozzle ring 31 is in contact with at least the wall surface 4a of the turbine housing 4. As described above, in the variable nozzle unit 25, the outer peripheral portion 41c of the support ring 41 is in contact with the wall surface 13a of the bearing housing 13. The outer peripheral portion 41c of the support ring 41 is in contact with the wall surface 4a of the turbine housing 4. Here, a plurality of (for example, three) non-contact portions 50 in which the outer peripheral portion 41c of the support ring 41 is not in contact with the turbine housing 4 are formed at a plurality of (for example, three) positions on the support ring 41 in the circumferential direction. These non-contact portions 50 are portions in which the outer peripheral portion 41c of the support ring 41 is not in contact with the bearing housing 13. It can be said that these non-contact portions 50 are portions in which the outer peripheral portion 41c of the support ring 41 is not sandwiched between the wall surface 4a of the turbine housing 4 and the wall surface 13a of the bearing housing 13.

These non-contact portions 50 are provided to allow the thermal deformation of the support ring 41. A temperature difference may occur between the members of the first nozzle ring 31, the support ring 41, and the bearing housing 13 when a temperature of the turbine 2 increases. A temperature of the first nozzle ring 31 may be higher than that of the support ring 41. Also, a temperature of the support ring 41 can be higher than that of the bearing housing 13. Thermal expansion of the first nozzle ring 31 and the support ring 41 is larger than that of the bearing housing 13. When the outer peripheral portion 41c of the support ring 41 is sandwiched while the first nozzle ring 31 is expanding outward in the radial direction, there is a possibility that the thermal expansion, that is, deformation/movement of the support ring 41 may be hindered. The non-contact portion 50 assists such deformation of the support ring 41. A linear expansion coefficient of the first nozzle ring 31 is substantially the same as a linear expansion coefficient of the support ring 41, for example. Also, a linear expansion coefficient of the support ring 41 is larger than that of the bearing housing 13.

Figure 3:
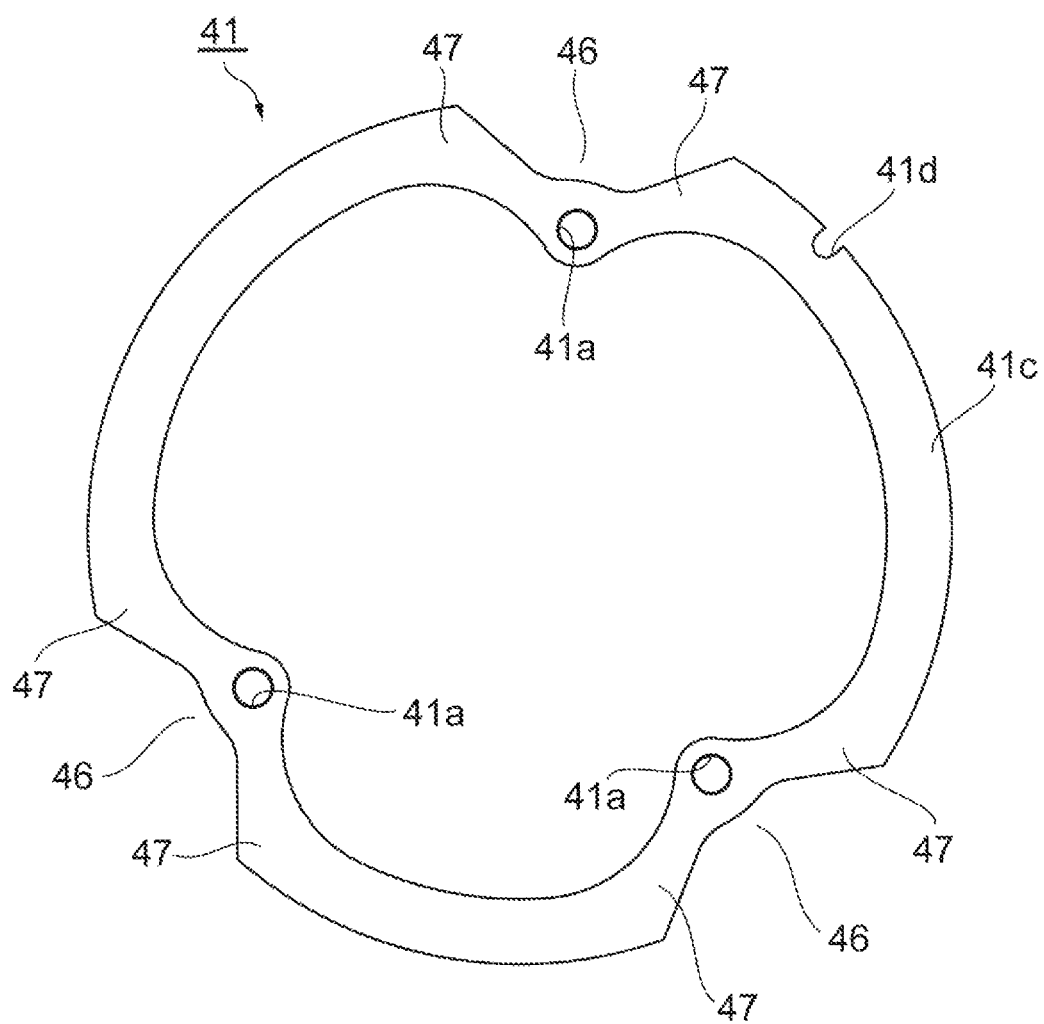
FIG. 3 is a view showing a support ring in FIG. 1.

The non-contact portion 50 is provided at a position corresponding to, for example, the connecting pin 35 in the circumferential direction. As shown in FIGS. 2 and 3, the non-contact portion 50 includes a plurality of (for example, three) cutout portions 46 formed in the outer peripheral portion 41c of the support ring 41. A pair of connecting portions 47 and 47 which extend obliquely from a annular main body portion toward the inner peripheral side are provided on both sides of the pin hole 41a to dispose the pin hole 41a at a predetermined position of the connecting pin 35 while forming the cutout portions 46. As described above, the cutout portion 46 is provided at the position corresponding to the connecting pin 35, that is, the position corresponding to the pin hole 41a. The "position corresponding to the pin hole 41a" may be a position in the circumferential direction which includes at least a position in the circumferential direction at which the pin hole 41a is formed. The "position corresponding to the pin hole 41a" may be the outer side of the pin hole 41a in the radial direction. From another viewpoint, the "position corresponding to the pin hole 41a" is a portion in which a radius passing through the pin hole 41a and an annular outer peripheral portion of the support ring 41 intersect.

A total range in which the plurality of cutout portions 46 are provided may be 5%© or more of the entire circumference, or 10% or more of the entire circumference. The total range in which the plurality of cutout portions 46 are provided may be 15% or more of the entire circumference. In consideration of a holding force for holding the variable nozzle unit 25 and a strength of the support ring 41, the total range in which the plurality of cutout portions 46 are provided may be 30% or less of the entire circumference, or 50% or less of the entire circumference. As shown in FIG. 3, a small groove 41d (for example, a positioning groove) may be provided at one location of the outer peripheral portion 41c of the support ring 41 in the circumferential direction, for example. Such a groove 41d is not included in the non-contact portion 50. In other words, the outer peripheral portion 41c of the support ring 41 is in continuous contact with the wall surface 4a of the turbine housing 4 in a region which excludes the cutout portion 46 (the non-contact portion 50). The outer peripheral portion 41c of the support ring 41 is in continuous contact with the wall surface 13a of the bearing housing 13 in the region which excludes the cutout portion 46 (the non-contact portion 50). The contact portions have a flat shape and an arc shape.

In the support ring 41 having such a shape, the outer peripheral portion 41c (shown by an imaginary line in FIG. 2) is sandwiched between the turbine housing 4 and the bearing housing 13 in most of the circumferential direction but is not sandwiched by the turbine housing 4 and the bearing housing 13 in the range in which the cutout portions 46 are provided. The non-contact portion 50 which includes the cutout portions 46 allows the support ring 41 to move in the radial direction at a portion around the pin hole 41a (including the connecting portion 47). At that time, the connecting portion 47 is deformed with respect to the annular main body portion, but a width and a thickness of the connecting portion 47 are taken into consideration so that damage (cracks or the like) does not occur due to a generated stress. That is, the support ring 41 is configured to avoid concentration of stress on the portion around the pin hole 41*a* when the support ring 41 is deformed. Further, a shape of the support ring 41 is determined so that the deformation of the support ring 41 in the direction of the rotation axis H can be curbed. In addition, in FIG. 1 and FIG. 2, cross sections at different positions are shown.

According to the above-described variable capacity turbocharger 1, the outer peripheral portion 41*c* of the support ring 41 is in contact with the turbine housing 4, and the variable nozzle unit 25 is held. The non-contact portions 50 in which the outer peripheral portion 41*c* of the support ring 41 is not in contact with the turbine housing 4 are formed at a plurality of positions on the support ring 41 in the circumferential direction. When the support ring 41 thermally expands due to the thermal expansion of the first nozzle ring 31, the thermal deformation of the support ring 41 is not hindered in the non-contact portion 50. Therefore, the thermal deformation of the support ring 41 of the variable nozzle unit 25 can be selectively controlled or modified to result in a predetermined shape. Conventionally, since the entire circumference of the flange portion of the support ring is held, the support ring is pressed, and there is a risk that other parts such as the nozzle ring and the connecting pin may be deformed. According to the present example, since a part of the support ring 41 is deformed (responsible for the deformation), the thermal deformation of such other parts is curbed.

The non-contact portion 50 is provided at a position corresponding to the connecting pin 35 in the circumferential direction. Due to an influence of the thermal expansion of the first nozzle ring 31 and the like, a large force particularly for the thermal expansion in the radial direction may be applied to a portion in which the connecting pin 35 is provided. When the non-contact portion 50 is provided at the position corresponding to the connecting pin 35, the support ring 41 can be deformed without any trouble when the support ring 41 receives this force. At this time, the connecting pin 35 also moves in the radial direction together. Therefore, an effect of preventing the deformation of other parts such as the first nozzle ring 31 and the connecting pin 35 is enhanced.

The above-described non-contact portion 50 can be simply and reliably created by changing the shape so that the outer peripheral portion 41*c* of the support ring 41 is cut out.

The variable nozzle unit 25 is held by the outer peripheral portion 41*c* of the support ring 41 being sandwiched between the turbine housing 4 and the bearing housing 13 in the portion which excludes the non-contact portion 50. In the non-contact portion 50, the outer peripheral portion 41*0* of the support ring 41 is not sandwiched between the turbine housing 4 and the bearing housing 13. Therefore, in the non-contact portion 50, the thermal deformation of the support ring 41 is not hindered, and the thermal deformation of the support ring 41 can be selectively controlled or modified to result in a predetermined shape.

Although an example of the present disclosure has been described above, the present disclosure is not limited to the above-described example. The present disclosure can include various modifications.

Figure 4:
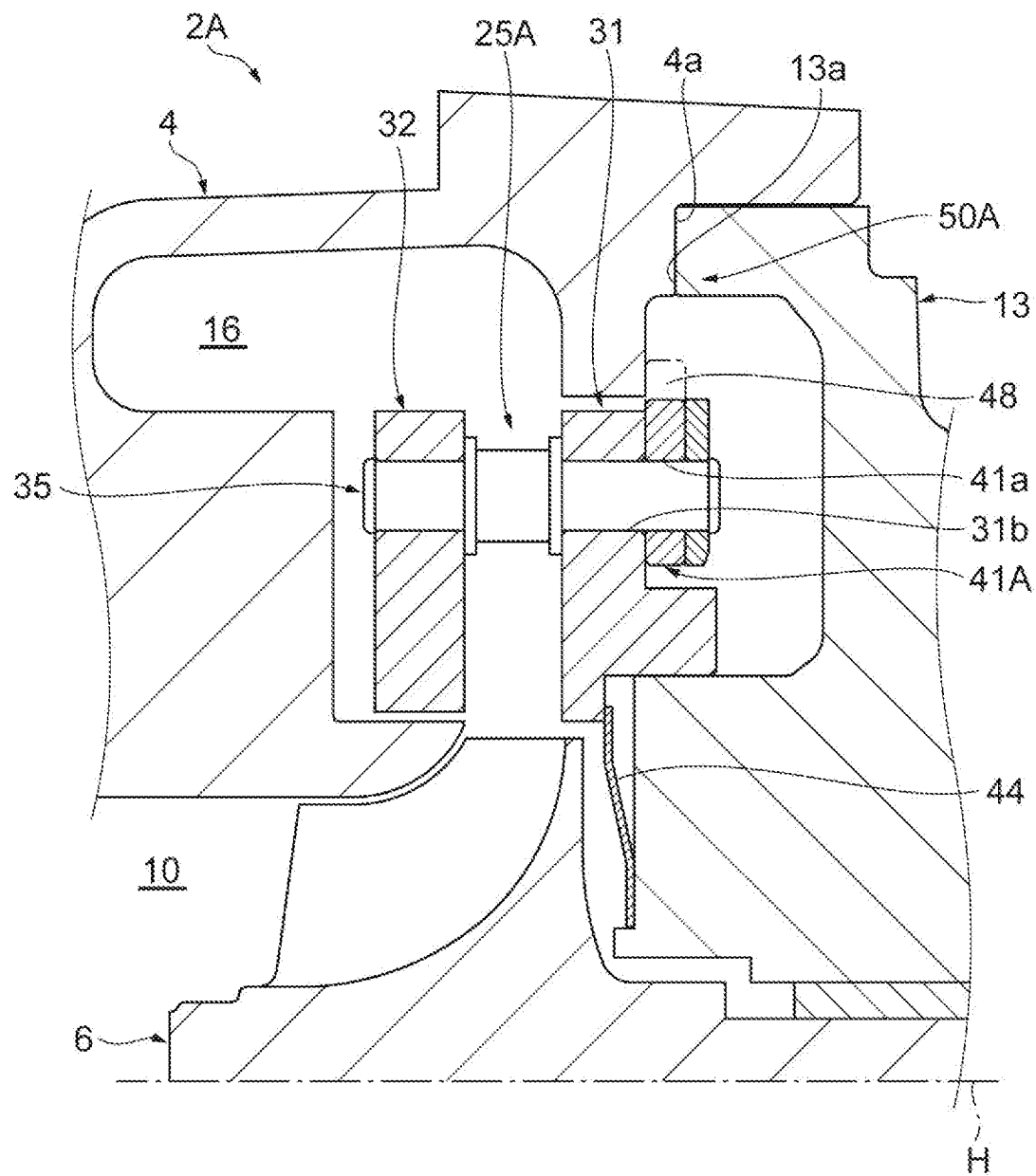
FIG. 4 is a cross-sectional view showing a holding structure of a variable nozzle unit according to a first modified example.

For example, as shown in FIG. 4, a variable nozzle unit 25A of a type in which the outer peripheral portion 41*c* of the support ring 41 is not sandwiched between the turbine housing 4 and the bearing housing 13 may be used. That is, the variable nozzle unit 25A is held by the first nozzle ring 31 being biased in the direction of the rotation axis H by the disc spring (the spring member) 44 disposed around the rotation axis H and the outer peripheral portion (shown by an imaginary line in FIG. 4) being pressed against the turbine housing 4 at the portion which excludes a non-contact portion 50A. The non-contact portion 50A is formed by the cutout portion 48, like the cutout portion 46 of the support ring 41. In the non-contact portion 50A, the outer peripheral portion of the support ring 41A is not pressed against the turbine housing. Therefore, in the non-contact portion 50A, the thermal deformation of the support ring 41A is not hindered, and the thermal deformation of the support ring can be selectively controlled or modified to result in a predetermined shape. Even with such a turbine 2A, the same actions and effects as those of the above-described example are exhibited.

Figure 5:
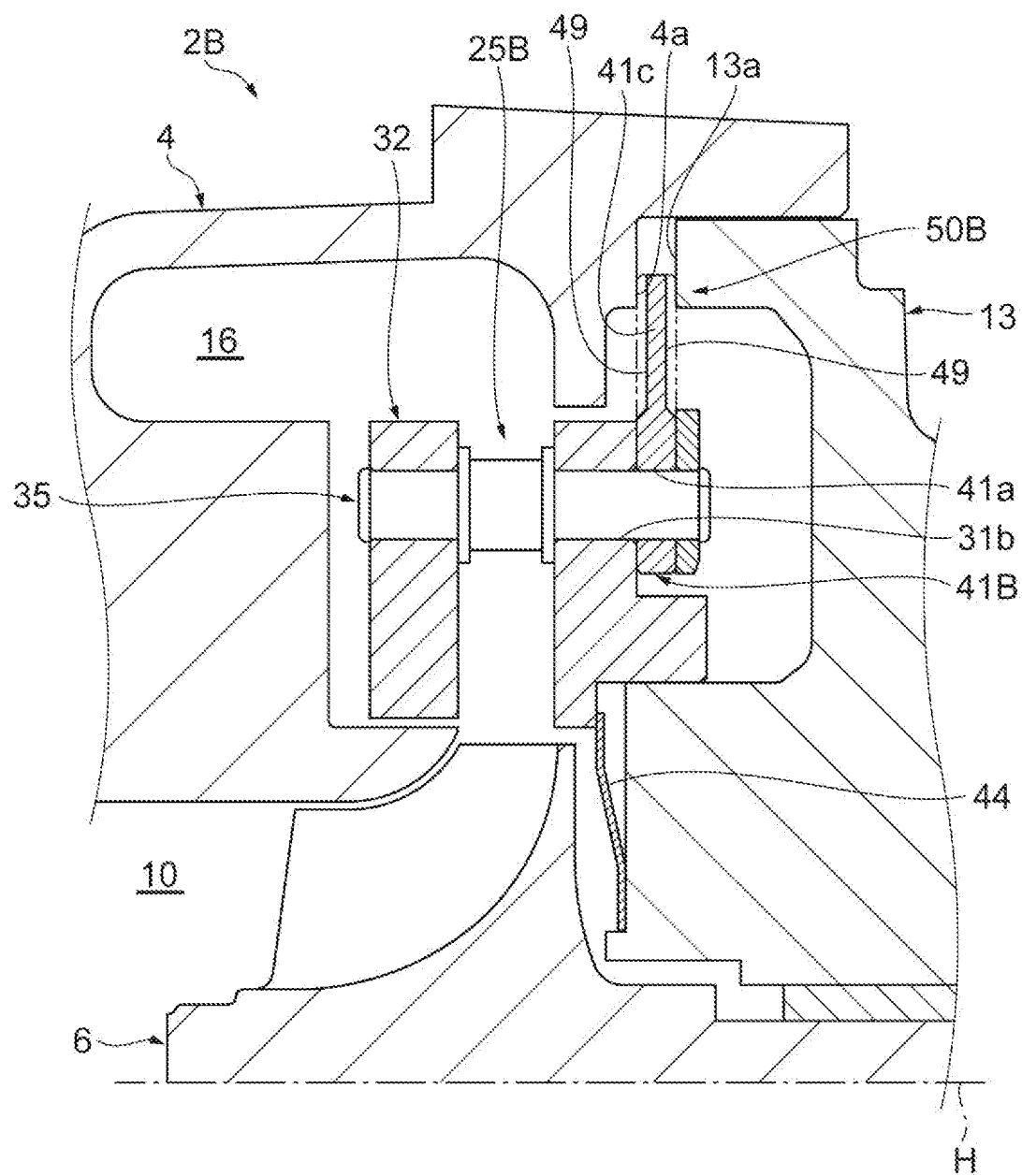
FIG. 5 is a cross-sectional view showing a holding structure of a variable nozzle unit according to a second modified example.

Further, as shown in FIG. 5, a non-contact portion 50B including a concave portion 49 which is formed in the outer peripheral portion 41*c* of the support ring 41B and is recessed in the direction of the rotation axis H may be provided. In this case, in the variable nozzle unit 25B, the non-contact portion 50B can be easily and reliably created by changing the shape so that the surface (for example, both surfaces) of the outer peripheral portion 41*c* of the support ring 41B is recessed. Even with such a turbine 2B, the same actions and effects as those of the above-described example are exhibited. The concave portion 49 may be formed only in one surface of the support ring 41B.

Figure 6:
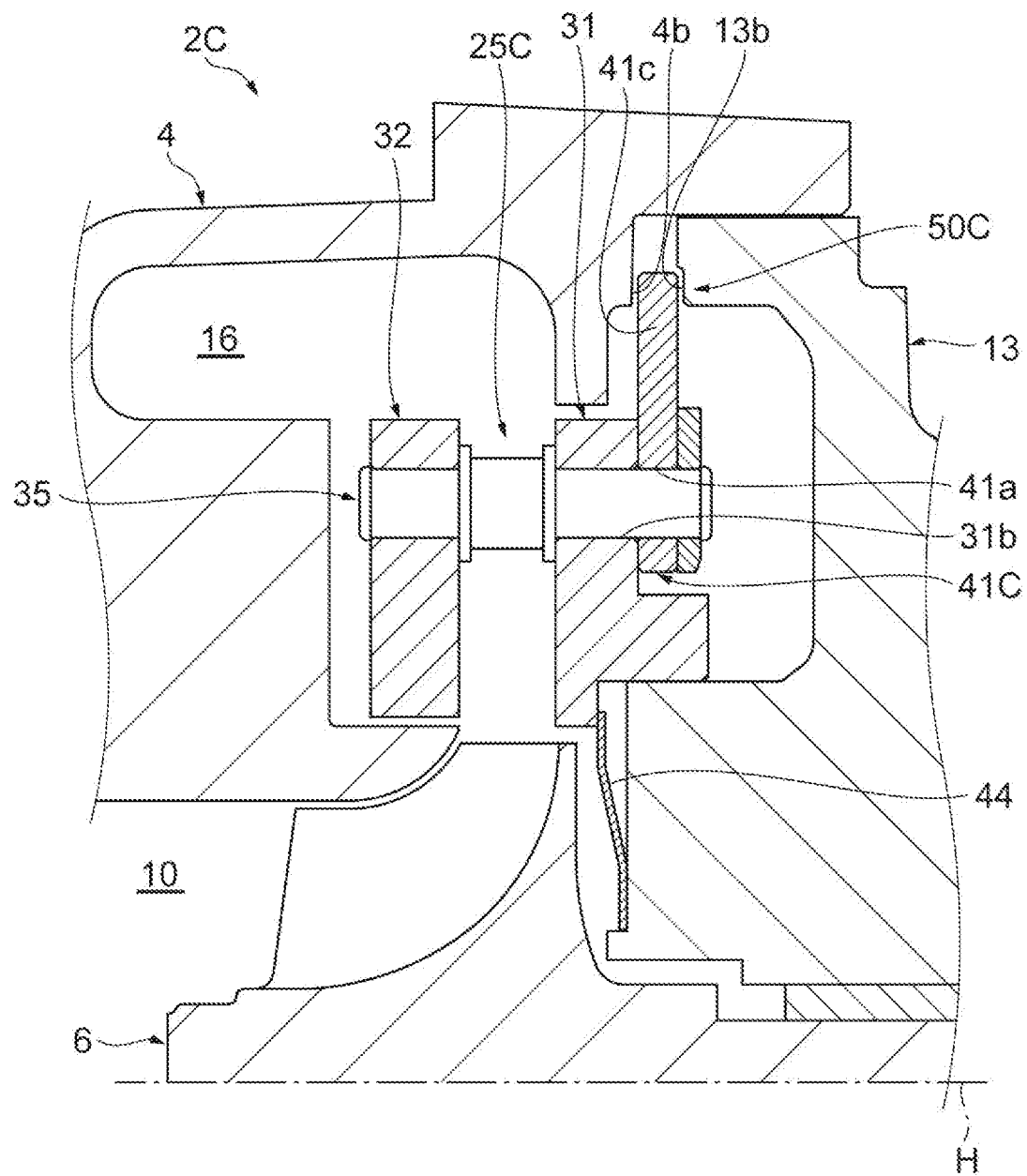
FIG. 6 is a cross-sectional view showing a holding structure of a variable nozzle unit according to a third modified example.

Further, as shown in FIG. 6, a non-contact portion 50C including a concave portion 4*b* which is formed in a portion of the turbine housing 4 that faces the outer peripheral portion 41*c* of the support ring 41C and is recessed in the direction of the rotation axis may be provided. The non-contact portion 50C may include a concave portion 13*b* formed in a portion of the bearing housing 13 which faces the outer peripheral portion 41*c* of the support ring 41C and is recessed in the direction of the rotation axis. In this case, the non-contact portion 50C can be simply and reliably created by changing the shape so that the surface of the turbine housing 4 is recessed. Even with the variable nozzle unit 25C and the turbine 2C, the same actions and effects as those of the above-described example are exhibited.

Further, the first nozzle ring 31 and the support ring 41 may be integrally formed. The support ring 41 may not be formed of a single member, and the outer peripheral portion 41*c* may be formed as a flange portion of the first nozzle ring 31.

When the plurality of pin holes 41*a* is provided in the support ring 41, the cutout portion 46, the cutout portion 48, or the concave portion 49 may be provided to correspond to positions of only some of the pin holes 41*a* but not all of the pin holes 41*a*. The non-contact portion may be formed only at one location in the circumferential direction. The non-contact portion may be provided at a position other than the position corresponding to the connecting pin.

The invention claimed is:
1. A turbocharger comprising:
a turbine housing configured to accommodate a turbine wheel provided at one end of a rotation shaft;
a bearing housing joined to the turbine housing and in which a bearing for supporting the rotation shaft is provided; and
a variable nozzle unit that is disposed between the turbine housing and the bearing housing and comprises:
a nozzle ring disposed around a rotation axis of the rotation shaft; and a support ring provided adjacent to the nozzle ring that comprises an outer peripheral portion partially in contact with the turbine housing,
wherein one or more non-contact portions are formed on an outer peripheral surface of the support ring and do not contact the turbine housing, and the outer peripheral surface is an end surface of the support ring in a radial direction of the support ring.

2. The turbocharger according to claim 1, wherein each non-contact portion comprises a concave portion that is formed in a portion of the turbine housing facing the outer peripheral portion of the support ring and is recessed in a direction of the rotation axis.

3. The turbocharger according to claim 1, wherein each non-contact portion comprises a concave portion that is formed in a portion of the bearing housing facing the outer peripheral portion of the support ring and is recessed in a direction of the rotation axis.

4. The turbocharger according to claim 1, wherein the variable nozzle unit is held by the outer peripheral portion of the support ring that is sandwiched between the turbine housing and the bearing housing at a portion which excludes the non-contact portion.

5. The turbocharger according to claim 1, wherein the nozzle ring is biased in the direction of the rotation axis by a spring member disposed around the rotation axis, and wherein the variable nozzle unit is held by the nozzle ring and the outer peripheral portion that is pressed against the turbine housing at a portion excluding the non-contact portions.

6. The turbocharger according to claim 1, wherein the nozzle ring and the support ring are integrally formed.

7. The turbocharger according to claim 1, wherein the non-contact portions comprise one or more concave portions formed in the outer peripheral portion of the support ring and recessed in a direction of the rotation axis.

8. The turbocharger according to claim 7, wherein each concave portion is provided on a surface of the outer peripheral portion facing the turbine housing.

9. The turbocharger according to claim 7, wherein each concave portion is provided on a surface of the outer peripheral portion facing the bearing housing.

10. The turbocharger according to claim 1,
wherein the variable nozzle unit comprises one or more connecting pins configured to connect the nozzle ring to the support ring, and
wherein the non-contact portions are provided at locations in the outer peripheral portion of the support ring corresponding to the connecting pins in a circumferential direction.

11. The turbocharger according to claim 10, further comprising:
one or more nozzle ring pin holes provided at the nozzle ring; and
one or more support ring pin holes provided at the support ring,
wherein at least one nozzle ring pin hole and at least one support ring pin hole are arranged as linearly arranged pin holes, and
wherein each connecting pin is inserted into the linearly arranged pin holes to connect the nozzle ring and the support ring.

12. The turbocharger according to claim 11, wherein the connecting pin comprises a flange portion configured to position the nozzle ring.

13. The turbocharger according to claim 11, wherein each non-contact portion is provided at a location where a radius passing through the support ring pin hole and the outer peripheral portion intersect.

14. A turbocharger comprising:
a turbine housing configured to accommodate a turbine wheel provided at one end of a rotation shaft;
a bearing housing joined to the turbine housing and in which a bearing for supporting the rotation shaft is provided; and
a variable nozzle unit that is disposed between the turbine housing and the bearing housing and comprises:
a nozzle ring disposed around a rotation axis of the rotation shaft; and
a support ring provided adjacent to the nozzle ring that comprises an outer peripheral portion partially in contact with the turbine housing,
wherein one or more non-contact portions are formed in the outer peripheral portion of the support ring and do not contact the turbine housing, and
wherein the non-contact portions comprise one or more cutout portions formed in the outer peripheral portion of the support ring.

15. The turbocharger according to claim 14, wherein each cutout portion comprises a pair of connecting portions which extend obliquely from an outer peripheral main body portion toward an inner peripheral of the outer peripheral portion.

16. The turbocharger according to claim 14, wherein a total range in which the one or more cutout portions are provided is equal to or more than 5% of the outer peripheral portion.

17. The turbocharger according to claim 14, wherein a total range in which the one or more cutout portions are provided is equal to or more than 15% of the outer peripheral portion.

18. The turbocharger according to claim 14, wherein a total range in which the one or more cutout portions are provided is equal to or less than 30% of the outer peripheral portion.

19. The turbocharger according to claim 14, wherein a total range in which the one or more cutout portions are provided is equal to or less than 50% of the outer peripheral portion.

20. The turbocharger according to claim 14, further comprising a positioning groove that is separated from each cutout portion and is provided at a location in the outer peripheral portion which is not included in the one or more non-contact portions.

* * * * *